United States Patent [19]

Magori

[11] Patent Number: 4,634,947
[45] Date of Patent: Jan. 6, 1987

[54] METHOD FOR EVALUATING ECHO SIGNALS OF AN ULTRASONIC SENSOR ON A ROBOT ARM

[75] Inventor: Valentin Magori, Munich, Fed. Rep. of Germany

[73] Assignee: Siemens Aktiengesellschaft, Berlin and Munich, Fed. Rep. of Germany

[21] Appl. No.: 645,340

[22] Filed: Aug. 29, 1984

[30] Foreign Application Priority Data

Sep. 29, 1983 [DE] Fed. Rep. of Germany ....... 3335421

[51] Int. Cl.⁴ .................... G05B 19/00; G01S 15/06
[52] U.S. Cl. .................................. 318/568; 367/100;
367/96; 73/628; 73/629; 73/632
[58] Field of Search ............. 367/87, 100, 96, 99,
367/108, 27, 34, 35; 318/568, 640; 73/618, 620,
624, 625, 627, 628, 629, 632, 641

[56] References Cited

U.S. PATENT DOCUMENTS

| | | | |
|---|---|---|---|
| 3,790,926 | 2/1974 | Pekaw | 367/100 X |
| 3,854,115 | 12/1974 | Barthelemy | 367/100 X |
| 3,860,928 | 1/1975 | Ehrlich | 367/100 X |
| 4,065,744 | 12/1977 | Delignieres | 367/87 |
| 4,159,462 | 6/1979 | Rocha | 367/87 X |
| 4,213,184 | 7/1980 | Fasching | 367/108 X |
| 4,234,939 | 11/1980 | Grall | 367/87 |
| 4,456,982 | 6/1984 | Tournois | 367/100 X |

FOREIGN PATENT DOCUMENTS 0030968 2/1982 Japan ....................... 367/87

Primary Examiner—William M. Shoop, Jr.
Assistant Examiner—Patrick C. Keane
Attorney, Agent, or Firm—Hill, Van Santen, Steadman & Simpson

[57] ABSTRACT

A method for evaluating echo signals transmitted and received by an ultrasonic transducer in a sensor of a movable mechanical element, such as an arm of an industrial robot, has the steps of receiving and storing the arriving echo signals in chronological sequence in a memory, the chronological sequence of the signal being converted into a corresponding sequence of memory positions, with successive sequences of echo signals of successive transmit pulses being stored in the same sequences of the memory positions. Integration of the echo signals of the successive sequences stored in the memory positions are undertaken such that the local shift of the ultrasonic transducer disposed on the moveable element which occurs between respective transmit pulses is compensated relative to chronologically adjacent pulses and the pulses reflected from a target are more easily identified.

14 Claims, 9 Drawing Figures

FIG 1a
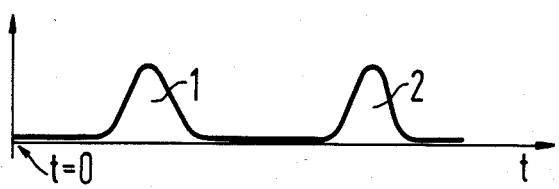
FIG 1b
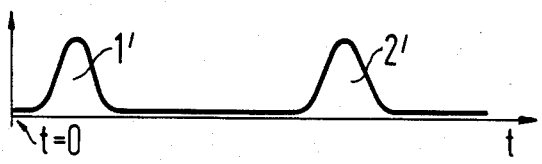
FIG 1c
FIG 1d
FIG 2a
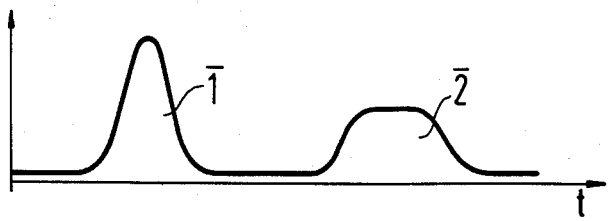
FIG 2b 4,634,947

METHOD FOR EVALUATING ECHO SIGNALS OF AN ULTRASONIC SENSOR ON A ROBOT ARM

BACKGROUND OF THE INVENTION

Field of the Invention

The use of ultrasonic transducers as distance sensors is known in robotics technology, both for recognizing an object and for positioning a movable element, such as an arm, of the robot. The low propagation velocity of the ultrasonic pulses, in comparison with electro magnetic radiation, permits a simple and direct measurement of the distance between the robot arm, or its gripper or tool, and the target object to be grasped or processed. The local resolution and precision of the guidance of such a robot arm on the basis of signal evaluation of ultrasonic echo signals is very high, and increases with decreasing distance, that is, as the robot arm approaches the target object. Moreover, ultrasonic transducers are small and light weight and can thus be mounted in a simple fashion on a robot arm.

An ultrasonic transducer which is particularly well suited for this application is described in German Pat. No. 2,541,492. This transducer has very good directional characteristics with comparatively small dimensions. Transducers of this type can be mounted on a robot arm in large numbers without impairing the other functions of the arm, such as the attachment of grippers or tools thereto.

Distance measurement with ultrasound is undertaken by transmitting a transmit pulse, receiving the reflected pulse from a target object, and evaluating the time delay of the received pulse with respect to the time of transmission of the transmit pulse. In making the evaluation, however, a distinction must be made between echo signals which originate from objects other than the target object. There are many methods known in the art for distinguishing such echo signals from each other.

SUMMARY OF THE INVENTION

It is an object of the present invention to provide a method for improved evaluations of echo signals received after reflection of ultrasonic transmit pulses.

It is a further object of the present invention to provide such a method which is suitable for use in robotics technology.

Another object of the present invention is to provide such a method having increased directional sensitivity or response over conventional signal evaluation methods.

A further object of the present invention is to provide such a method which permits detection of a selected target in directions obliquely disposed with respect to a 0° or dead center axis of the ultrasonic transducer without the necessity of alteration or mechanical adjustment of the ultrasonic transmitter.

Another object of the present invention is to provide such a method which minimizes interferences and/or echos produced by moving targets and which thereby achieves an improvement of the signal to noise ratio of the received echo signal thereby permitting object recognition in some cases.

A further object of the present invention is to provide such a method which embodies self-corrective steps.

The above objects are inventively achieved in a method for evaluating echo signals which are reflections of continuously transmitted transmit pulses of an ultrasonic transducer, the ultrasonic transducer being mounted on a moving part of a robot, wherein the echo signals of a particular transmit pulse arriving in chronological sequence are received in a corresponding sequence in a memory, the chronological sequence being converted into a sequence of memory positions. Successive sequences or trains of echo signals of successive transmit pulses are stored in the same sequences at the memory positions. An integration of the echo signals of successive sequences stored in the memory positions is conducted such that the local position shift of the transducer, which shift occurs as the moving part is continuously moved between respective transmit pulses, is compensated for successive echo signal sequences.

The integration is effected in such a manner that the desired integrated signal is not influenced by the position change of the transducer which has occurred between the individual transmit pulses. A target not intentionally aimed at with the ultrasonic transmitter disappears in the integrated signal, and an increased signal to noise ratio between the useful signal to be evaluated and other echo signals is achieved, as well as between the useful signal and spurious signals such as noise and acoustic coupling between transducers. The echo signals associated with a first-transmitted transmit pulse are recieved in chronological sequence and are stored in a memory such that the chronological signal train is converted into a corresponding sequence or train of memory positions. The train of the echo signals of the next-following second transmit pulse is also received in this manner and is summed or integrated with the immediately preceeding received and stored echo signal sequence. The echo signals of the second transmit pulse, however, are stored in their chronological sequence in the memory positions such that the echo signal to be evaluated, that is, the echo signal for the target object, is stored in the memory position in which the echo signals for the first transmit pulse were stored. This is continued in the same manner for the third, fourth and all additional transmit pulses. The shifting of the storage signifies that the echo time delay for the echos of the second transmit pulse has been electronically altered by the amount which corresponds to the change in distance between the ultrasonic transducer and the target object between the transmission times of the first and second transmit pulses. The same applies to the distance change between the second and third transmit pulses, and between all successive pairs of transmit pulses. The shifting may also be related to the relative distance change which occurs between the transducer moved in one direction and an object located lateraly relative thereto at an angle $\alpha$. The time shift (or memory position shift) can be also utilized to conduct integration to evaluate movement of the transducer (and hence of the robot arm on which it is mounted) for many solid angle directions $\alpha_1, \alpha_2 \ldots$. It is assumed that for the straight forward direction of the transducer, $\alpha_o = 0°$. Integrations for various angles $\alpha_o, \alpha_1, \alpha_2 \ldots$ can be chronologically successively conducted such as by time division multiplexing. Given suitable electronics, such integrations can also be simultaneously conducted for the angle $\alpha_o = 0°$ and $\alpha_1, \alpha_2 \ldots$. For a particular object, in addition to the distance of the target object from the transducer determined from the signal time delay, the angle for the direction of movement can also be determined. This means that an object detected in an angular range $\alpha_i$ is disposed within a measurable distance from the ultrasonic receiver on the cone envelope for the solid angle $\alpha_i$ relative to the movement direction of the transducer and robot arm, that is, on the annular region which, from the ultrasonic receiver, is viewed at the distance corresponding to the signal time delay in the angle $\alpha_i$ relative to the movement direction.

Although this spatial identification of an object is sufficient for many purposes such as, for example, collision avoidance, wherein it is not important at which side a robot gripper comes in contact with a target object, in many instances it is desirable to move precisely define the spatial position of an object, for example, to determine in what direction an object can be avoided. This can be achieved by the use of multiple arrangements of spatially distributed ultrasonic receivers on the moving robot arm in which the object, for each transducer, appears in a separate annular region at the angle $\alpha_{ij}$. An unambiguous local position of the object is thus identified as that particular region at which the rings intersect. If only two ultrasonic receivers are utilized, generally two intersection regions result and the position of the object may still be ambiguous.

In the case of multiple sensor arrangements, it is sufficient to radiate ultrasonic pulses with a single transmitting transducer and to receive the echo pulses with several locally distributed receiving transducers. The ultrasonic pulses may be transmitted at different times from different transducers, or may be coded differently from each other in order to more easily associate a received pulse with a particular transmit pulse. It is also possible to use a single receiving transducer with several spatially distributed transmitting transducers.

For objects disposed outside the movement direction at an angle alpha, the angle alpha at which those objects are viewed changes during movement of the robot arm, and correspondingly the relative speed changes between the moving transducer and this object. The relative speed v' can be calculated by the following equation:

$$v' = \frac{v^2 (t - t_o)}{\sqrt{a^2 + v^2 (t - t_o)^2}}$$

and the angle $\alpha$ at which the object is viewed is as follows:

$$\alpha = \arccos v'/v$$

In the above equations, v is the speed of the moving transducer in the movement direction, a is the lateral distance of the object from the instantaneous path of the moving transducer if the transducer were further moved in a rectilinear or orthogonal fashion, and $(t-t_o)$ is the time difference until the time $t_o$ at which the transducer on this path would pass by the object with the least distance.

The closer the object approaches, the smaller the relative speed becomes. By continuous integration of the memory positions of the echo signals at which the shift from the chronological interval to the transmitting time differs, the echo signal can be amplified even in the case of a variable relative speed. In the ideal case, this means that echos for objects are amplified which are disposed on a cylindrical jacket surrounding the movement direction. In a similar manner, by a distance-dependant compensation of relative speed, the echo signals are amplified for objects which are disposed on the surfaces of other rotations about the movement direction.

With an unknown angle, a further embodiment of the present invention permits the shift of the image to be successively integrated such that the increase of the integrated echo signal becomes maximum. For this purpose, various shifts can be considered, and the shift can be identified at which the integrated echo signal rose maximally. Instead, however, a calculation can be undertaken to determine when the correlation between the integrated signal and the instantaneous echo is maximum, this indicating the correct shift. The shift can be adoptively selected corresponding to the relative speed prior to integration and thereby amplifying the echo for an object of unknown position. Through the shift resulting thereby, the displacement of the object, that is, its instantaneous angle relative to the movement direction, can thus be unambiguously determined. It can also be recognized whether the object is positioned in the movement direction.

DESCRIPTION OF THE DRAWINGS

FIGS. 1a and 1b respectively show two received echo signals for a first transmit pulse and the contents of memory positions allocated thereto.

FIGS. 1c and 1d show two echo signals corresponding to a second transmit pulse and the contents of memory positions allocated thereto.

FIGS. 2a and 2b respectively show integration of the memory contents of FIGS. 1b and 1d with a shift in accordance with the principals of the method disclosed and claimed herein, and reconstruction of the way form corresponding to the integration result.

DESCRIPTION OF THE PREFERRED EMBODIMENTS

Figure 3:
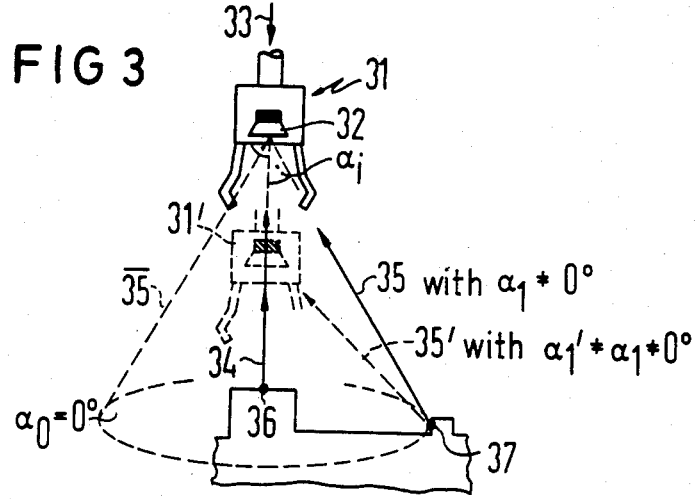
FIG. 3 is a schematic illustration of an ultrasonic transducer for transmitting and receiving ultrasonic signals for evaluation in accordance with the principles of the method disclosed and claimed herein mounted on a robot arm showing movement relative to an object.

The amplitudes of echo signals 1 and 2, corresponding to the reflection of a transmit pulse from two different objects are shown in FIG. 1a plotted with respect to time t. The transmit pulse was transmitted at t=0. The amplitude of the echo signals 1 and 2 at various times along the t-axis is assigned a value by any suitable means well known to those skilled in the art, such as by a series of threshold devices, the values for each time being stored in sequence in respective memory positions. As shown in FIG. 1b, the instantaneous values of the amplitudes are stored at memory positions referenced at 3, and the address of those memory positions are indicated in line 4. FIG. 1c shows the amplitudes of echo signals 1' 2' for the next-following transmit pulse. The chronological spacing of the echo signals 1' 2' from each other is different than the chronological spacing between the echo signals 1 and 2 shown in FIG. 1a, because the first object, giving rise to echo signals and 1 and 1', is presumed to be disposed directly in line with the movement direction of the ultrasonic transducer generating the transmit pulses, whereas the second object, giving rise to the pulses 2 and 2', is assumed to be disposed laterally at an angle relative to this direction of movement. Specifically, as described in greater detail in connection with FIG. 3, pulses 1 and 1' are assumed to arise from reflection from location 36 ($a_o=0°$) and pulses 2 and 2' are assumed to arise from reflection location 37 disposed at an angle $a_1$ with respect to $a_o$. Storage of the echo signals 1' and 2' proceeds in the same manner described in connection with FIG. 1b, the resulting memory positions 3 at memory addresses 4 being shown in FIG. 1d. The echo signals for the next transmit pulse are received and stored in a corresponding manner.

In FIG. 2a, the memory result of FIG. 1b is reproduced referenced at 21, and the memory result of FIG. 1d, shifted by an amount 24, is reproduced preferenced at 22. The relatively shifted memory contents are summed or integrated, the integration result being referenced at 23, again with memory contents being indicated at 3 and memory addresses being indicated at 4. The shift 24 shown in FIG. 2a corresponds to movement of the ultrasonic transducer in a direction toward the target object. Again, with specific reference to FIG. 3 the transducer 32 is assumed to be moving in the direction 34 during a period between the transmit pulses giving rise to the respective echo signals. In a corresponding manner, the echo signals for successively following transmit pulses, stored in memory positions 3, are also integrated. As shown in FIG. 2b, a wave form has been reconstructed corresponding to the amplitude magnitudes shown at 23, resulting in an integrated echo signal $\overline{1}$ for the target object and an integrated echo signal $\overline{2}$ for a second unwanted object. As is apparent, the integrated echo signal $\overline{2}$ is substantially smaller in comparison to the highlighted integrated echo signal $\overline{1}$. The contrast will be larger as the frequency of the conducted integrations increases, the integrated echo signal 1 assuming an increasingly higher amplitude.

The effect of the integration described above is that a target object 1, such as an object to be grasped by the gripper bar of a robot arm, is emphasized, while other objects, even locally very close objects, such as the object indicated by the signals 2 and 2', are suppressed. Thus the directional characteristics of the transducer have been sharpened by this evaluation method in contrast to the directionality characteristic possessed by the transducer itself.

It is also possible, however, to conduct an integration for emphasizing the echo signal for the object giving rise to echo pulses 2 and 2' by shifting the memory contents shown in FIGS. 1b and 1d such that memory positions 14, 15 and 16 of FIG. 1b are integrated with memory positions 13, 14 and 15 of FIG. 1d. In this case a signal peaking or boost of the echo signal for the second object results. This causes an object to be emphasized which is disposed at a solid angle $a_1$ relative to the transmitting ultrasonic transducer and its instantaneous movement direction. This second object is emphasized through this integration not only with respect to the first object (disposed in the direct direction of movement) but also with respect to other objects disposed on yet other solid angles $a_1, a_2 \ldots$ relative to the transducer and its instantaneous movement direction. The integration may also be conducted so as to emphasize an object disposed on the solid angle $a_2$. In general, it is possible to conduct such various integrations either successively or simultaneously for emphasizing any number of various objects disposed at various solid angles $a_i$. Successive integrations can be conducted as described above; simultaneous integrations require the use of parallel-connected memory combinations.

A schematic representation of the use of the evaluation method disclosed and claimed herein in the context of controlling movement of a robot arm is shown in FIG. 3. The robot arm (not further illustrated) has a gripper 31 disposed at an end thereof. An ultrasonic transducer 32 is mounted on the gripper 31. The ultrasonic transducer 32 transmits a fraction 34 of its ultrasonic radiation along a direction coincident with the direction 33 of direct movement of the gripper 31 at an angle $_{o=}0°$, and also transmits a fraction 35 of its ultrasonic radiation at an angle $a_1$. Echo signals are received by the transducer 32 which return along the paths 34 and 35. At the time of the next-following transmit pulse of the transducer 34, the gripper 31 has already attained the position 31', illustrated in dashed lines, with a corresponding alteration of the distances relative to reflection locations 36 and 37 giving rise to the above-described echo signals. If the integration (as shown in FIG. 2a). is to be related to a first object disposed in FIG. 3 at the location 36, the echo signal $\overline{2}$ for the location 37 disappears after multiple integration. As stated above, this is because of the continuously changing distances between the reflection location 36 and the gripper 31 and between the reflection location 37 and the gripper 31, as indicated by the new position 31 prime. This distance change can also be regarded as an angle change from $a_1$ to $a_1$, with respect to the direct angle $a_o$. As also described above, the echo signal for any one object with respect to another object can be emphasized in accordance with the method disclosed herein.

Figure 4:
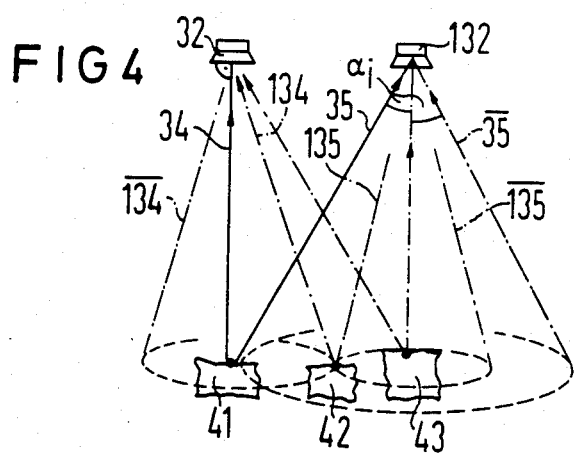
FIG. 4 is a schematic illustration of two ultrasonic transducers for transmitting and receiving ultrasonic signals in accordance with the principles of the method disclosed and claimed herein mounted on a robot arm.

The use of the method disclosed herein for identifing multiple objects is schematically represented in FIG. 4. In this instance, objects 41, 42 and 43 are to be distinguished from each other depending upon the allocation of the memory addresses during integration, that is, depending upon specification of the shift 24. Associated with each of the objects 41, 42 and 43 are angles $a_o \neq 0° = a_1 \neq a_2$.

As also shown in FIG. 4, a second transducer 132 is utilized, which may be mounted on the same gripper 31 as the first transducer 32. Because the transducers 32 and 132 are adjacently disposed, an amplitude increase of the echo signals from the object 41 (received by the transducer 132) will be different than the amplitude increase for the same object based on echo signals received by the transducer 32, because the shift for the signals received by the transducer 32 occurs for movement with the angle $a_o=0°$, while the shift for the signals received by the transducer 132 is undertaken based on the relative movement at the angle $a_i(a_i=0°)$. The arrow 35 means that the angle $a_i$(different from 0°) only indicates that the object 41 lies somewhere on the cone envelope indicated by lines 35 and $\overline{35}$. Reference symbols 134 and 135 refer to directions for which, for each transducer 32 and 132, the amplitude increases for the integrated echo signals occur only in the case of a corresponding allocation during integration. This means that in the case of an allocation or shift corresponding to relative movement in direction 134, for integration of echo signals of the transducer 32, and in the case of another allocation or shift corresponding to the angle $\alpha_i$ for the transducer 132, the object 42 is the target object.

Figure 5:
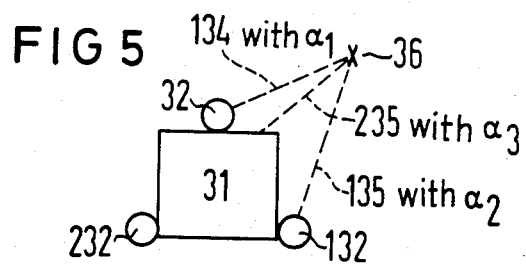
FIG. 5 is a schematic illustration of three ultrasonic transducers for generating ultrasonic transmit and receive signals for evaluation in accordance with the principles of the method disclosed and claimed herein for unambiguious position determination.

As shown in FIG. 5, at least three transducers 32, 132 and 232 may be disposed, preferably in one plane on the gripper 31, which permits the target object to be identified electronically. FIG. 5 is the view seen from the gripper 31, which is assumed to be in the direction of instantaneous movement of the gripper 31 perpendicular to the plane of FIG. 5. A signal peaking or boost for the object 41 is obtained for the transducer 32 for an integration shift corresponding to the angle $\alpha_1$, for the transducer 132 corresponding to the angle $\alpha_2$, and for the transducer 232 corresponding to the angle $\alpha_3$ along respective paths 134, 135 and 235. A correction component can be calculated, which correction component is lateral to the above angles, which can be utilized to guide the gripper 31 to the object 51 without deviation.

As stated above, the integrations for the various angles with different shifts 24 for the memory addresses, can be simultaneously conducted with suitable parallel electronics. The same method may, however, be undertaken utilizing time division multiplexing methods for successively integrating the signals associated with the individual angles $\alpha_1$, $\alpha_2$ and $\alpha_3$.

Although other modifications and changes may be suggested by those skilled in the art it is the intention of the inventor to embody within the patent warranted hereon all changes and modifications as reasonably and properly come within the scope of his contribution to the art.

I claim as my invention:

1. A method of evaluating ultrasonic echo signals reflected from an object to be detected and from other objects after continual transmission of a plurality of successive ultrasonic transmit pulses incident on all of said objects from at least one ultrasonic transducer, said transducer being mounted on a movable part and said signals being used at least in part for guiding movement of said movable part, said method comprising the steps of:
   receiving a first plurality of echo signals from all of said objects in chronological sequence associated with a first transmit pulse and storing said first plurality of echo signals in a memory at first addresses ordered corresponding to said chronological sequence;
   receiving a second plurality of echo signals from all of said objects in chronological sequence associated with a second transmit pulse and storing said second plurality of echo signals in a memory at second addresses ordered corresponding to said chronological sequence;
   shifting the contents of said first and second memory addresses relative to each other by at least one selected amount for compensating for movement of said movable part relative to said object to be detected between said first and second transmit pulses;
   integrating the contents of the shifted first and second memory addresses for emphasizing selected echo signals thereby identifying said object to be detected; and
   repeating the steps of receiving, shifting and integrating for echo signals associated with each successive transmit pulse.

2. A method for evaluating ultrasonic echo signals as claimed in claim 1 wherein said movable part exhibits an instantaneous direct movement and wherein the step of shifting the contents of said first and second memory addresses is further defined by shifting the contents of said first and second memory addresses relative to each other by a selected amount for compensating or said direct movement of said movable part between said first and second transmit pulses.

3. A method for evaluating ultrasonic echo signals as claimed in claim 1 wherein said movable part exhibits an instantaneous direct movement and wherein the step of shifting the contents of said first and second memory addresses is further defined by shifting the contents of said first and second memory addresses relative to each other by a selected amount for compensating for said direct movement of said movable part between said first and second transmit pulses and for compensating for movement of said movable part at at least one selected solid angle relative to said direct movement between said first and second transmit pulses.

4. A method for evaluating ultrasonic echo signals as claimed in claim 3 wherein said solid angle is determined by the instantaneous distance between said transducer and one of said objects which is not disposed in the direction of said direct movement of said movable part.

5. A method for evaluating ultrasonic echo signals as claimed in claim 3 wherein the steps of shifting the contents of said first and second memory addresses and integrating the contents of the shifted first and second memory addresses are further defined by the steps of:
   shifting the contents of said first and second memory addresses relative to each other by a plurality of successive selected amounts for respectively compensating for movement of said movable part at a like plurality of selected solid angles relative to the direction of said direct movement of said movable part between said first and second transmit pulses; and
   integrating the contents of the first and second memory addresses for each shift thereof for emphasizing echo signals respectively associated with each of said solid angles.

6. A method for evaluating ultrasonic echo signals as claimed in claim 1 wherein a plurality of ultrasonic transducers are mounted spaced from each other on said movable part and wherein the steps of receiving and storing said first plurality of echo signals, receiving and storing said second plurality of echo signals, shifting of the contents of said and first and second memory addresses, and integrating the contents of the shifted first and second memory addresses are conducted for each of said transducers and comprising the additional step of evaluating the result of each integrating step for each transducer in combination for reducing the ambiguity of said selected echo signals.

7. A method for evaluating ultrasonic echo signals as claimed in claim 6 wherein said plurality of ultrasonic transducers includes one transmitting transducer for transmitting said ultrasonic transmit pulses and at least two receiving transducers for receiving said echo signals.

8. A method for evaluating ultrasonic echo signals as claimed in claim 6 wherein said plurality of transducers includes one receiving transducer for receiving said ultrasonic echo signals and at least two transmitting transducers for transmitting said ultrasonic transmit pulses.

9. A method for evaluating ultrasonic echo signals as claimed in claim 6 wherein each of said plurality of transducers is a transmitting transducer for transmitting for said ultrasonic transmit pulses and a receiving transducer for receiving said ultrasonic echo signals.

10. A method for evaluating ultrasonic echo signals as claimed in claim 8 wherein each of said transmitting transducers transmits said ultrasonic transmit pulses at a different time period.

11. A method for evaluating ultrasonic echo signals as claimed in claim 8 wherein each of said transmitting transducers transmits ultrasonic transmit pulses which are respectively coded for differentiation from each other.

12. A method for evaluating ultrasonic echo signals as claimed in claim 1 wherein the step of shifting the contents of said first and second memory addresses is further defined by shifting the contents of said first and second memory addresses relative to each other by an amount selected for maximally amplifying said echo signals after integration thereof.

13. A method for evaluating ultrasonic echo signals as claimed in claim 12 wherein the step of shifting the contents of said first and second memory addresses is further defined by shifting the contents of said first and second memory addresses relative to each other by an amount determined by the correlation between an integrated echo signal and an instantaneous echo signal.

14. A method for evaluating ultrasonic echo signals as claimed in claim 12 comprising the additional steps of calculating the relative speed of movement of said movable part, calculating an angle between the position of a selected object and the direction of movement of said movable part, and calculating the distance between said movable part and a selected object based on the amount of shifting of the contents of said first and second memory addresses relative to each other.

* * * * *